No. 636,373. Patented Nov. 7, 1899.
G. WILMS.
MACHINE FOR MAKING PARAGON FRAMES FOR UMBRELLAS.
(Application filed Jan. 3, 1898.)

(No Model.) 5 Sheets—Sheet 1.

Witnesses:
E. F. Rittmeyer
C. Brett

Inventor:
Gustav Wilms
by Fairfax & Vetter
Attorneys

No. 636,373. Patented Nov. 7, 1899.
G. WILMS.
MACHINE FOR MAKING PARAGON FRAMES FOR UMBRELLAS.
(Application filed Jan. 3, 1898.)
(No Model.) 5 Sheets—Sheet 2.
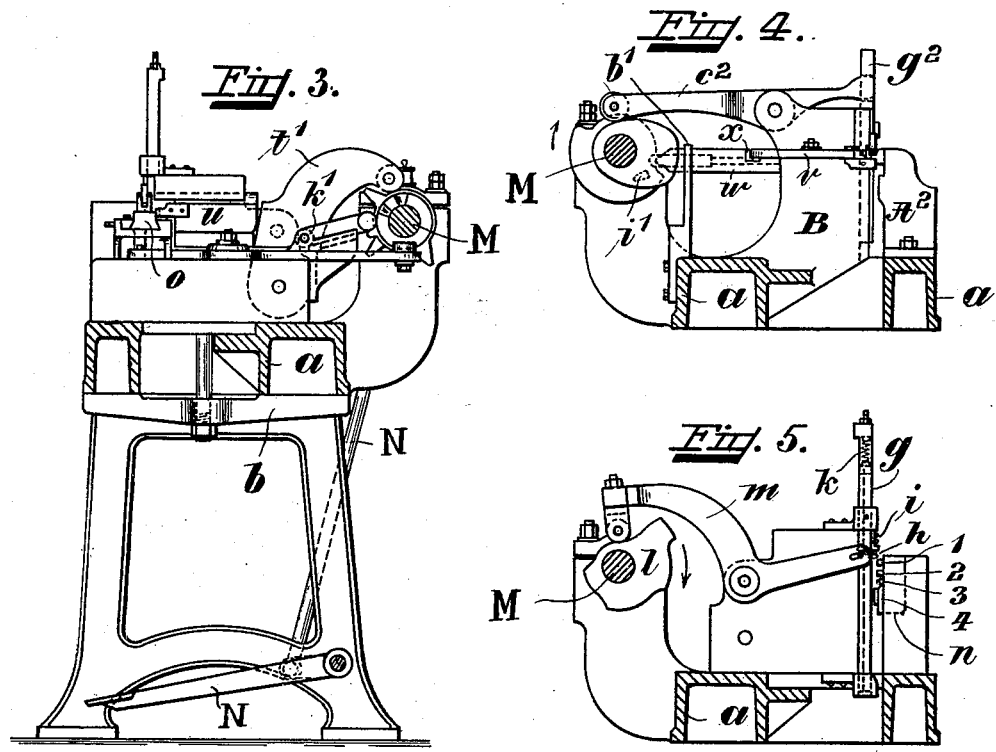
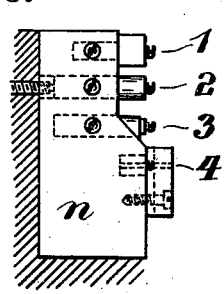
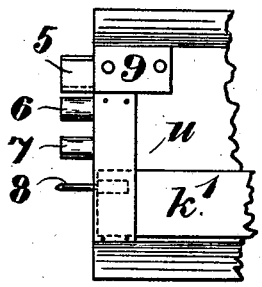
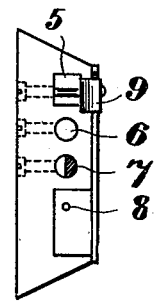
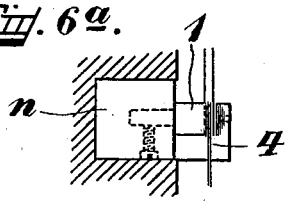
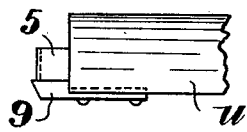
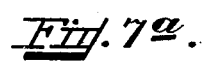
Witnesses:
Inventor:
Gustav Wilms
by Fairfax & Wetter
Attorneys No. 636,373. Patented Nov. 7, 1899.
G. WILMS.
MACHINE FOR MAKING PARAGON FRAMES FOR UMBRELLAS.
(Application filed Jan. 3, 1898.)
(No Model.) 5 Sheets—Sheet 3.
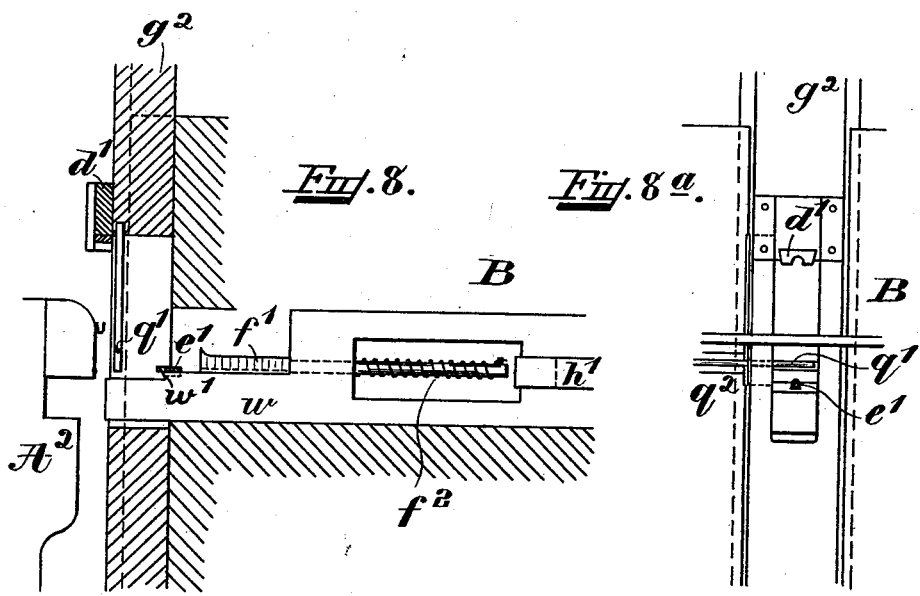
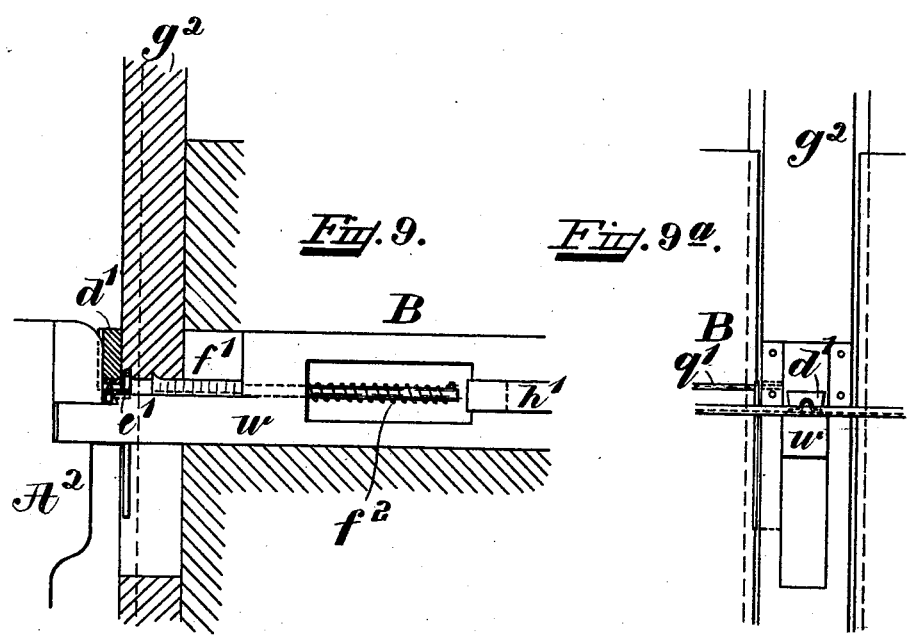
Witnesses.
C. Britt
EBChristmas.
Inventor:
Gustav Wilms
by Fairfax & Vetter
Attorneys

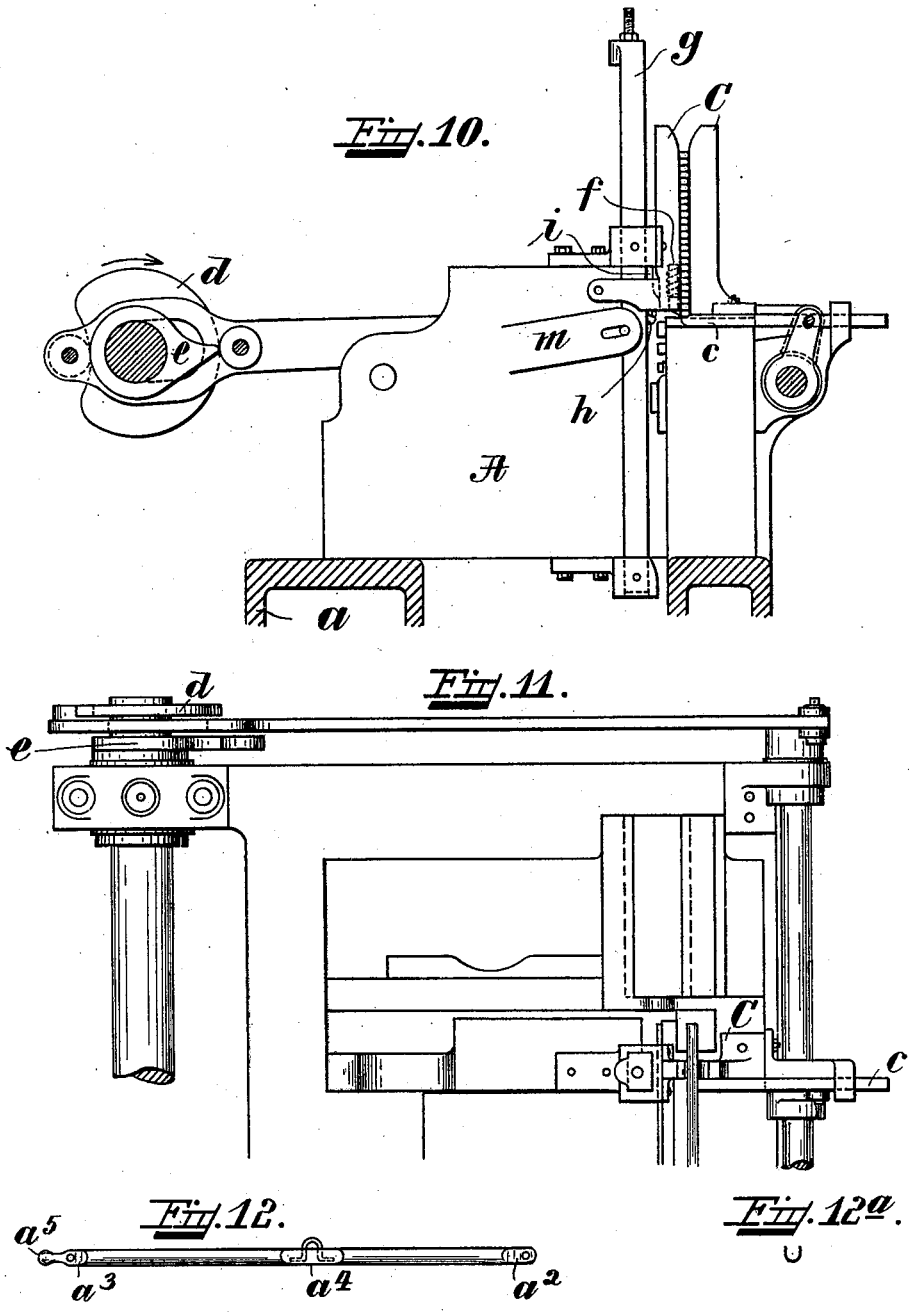

No. 636,373. Patented Nov. 7, 1899.
G. WILMS.
MACHINE FOR MAKING PARAGON FRAMES FOR UMBRELLAS.
(Application filed Jan. 3, 1898.)

(No Model.) 5 Sheets—Sheet 5.

Witnesses:

Inventor:
Gustav Wilms
by Fairfax & Ketter
Attorneys

UNITED STATES PATENT OFFICE.

GUSTAV WILMS, OF VILVOORDEN, BELGIUM.

MACHINE FOR MAKING PARAGON FRAMES FOR UMBRELLAS.

SPECIFICATION forming part of Letters Patent No. 636,373, dated November 7, 1899.

Application filed January 3, 1898. Serial No. 665,481. (No model.)

*To all whom it may concern:*

Be it known that I, GUSTAV WILMS, a subject of the German Emperor, residing at Rue du Mouton d'Or 11, Vilvoorden, near Brussels, Belgium, have invented certain new and useful Improvements in Machines for the Automatic Manufacture of Finished Paragon Frames for Umbrellas, of which the following is a full, clear, and exact specification.
This invention relates to the manufacture of paragon ribs or metal ribs of U-shaped cross-section for umbrella-frames, and has for its object to provide an efficient machine adapted to operate on wire of U-shaped section simultaneously at three places, while the wire is mounted in the machine with its groove directed upward instead of downward, as is the case with the processes and machines hitherto known. The wire of U-shaped cross-section is first cut into pieces corresponding to the length of the ribs, which pieces are then piled up in a row, so that they rest upon one another with their long sides and are guided or held near their ends in a pair of upright feed-channels, whence they are placed one after the other in front of vertically-movable slides adapted to grip the said ribs (one at a time) with their grooves directed upward and to place them consecutively within the reach of four operating-tools placed one above the other.

In further describing the invention reference will be made to the accompanying drawings, of which—

Figure 1:
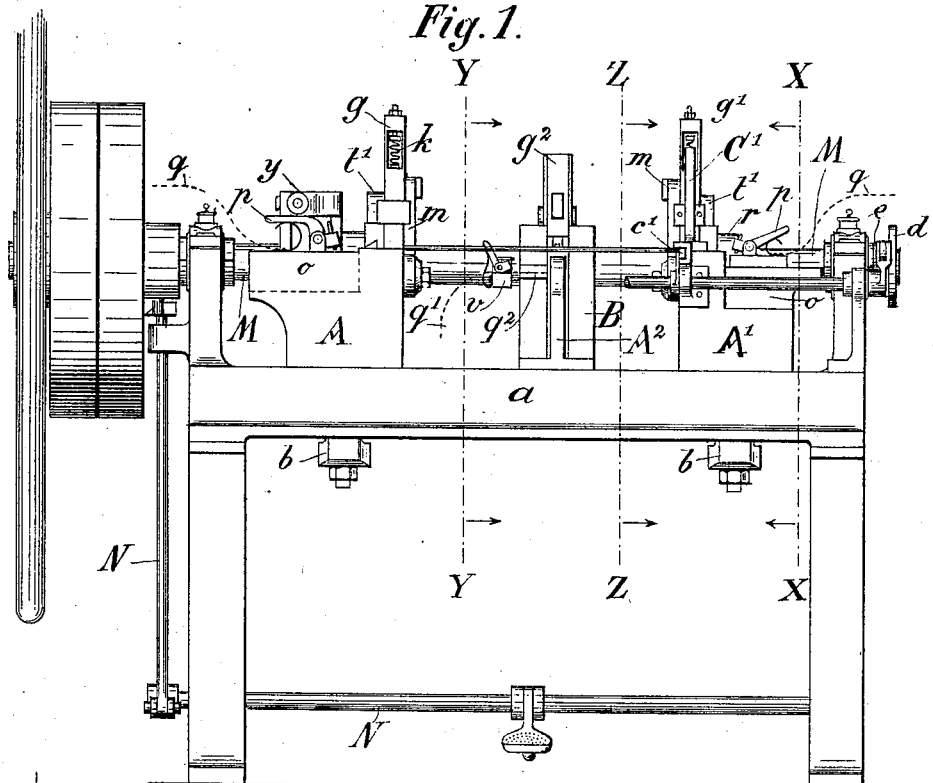
Figure 2:
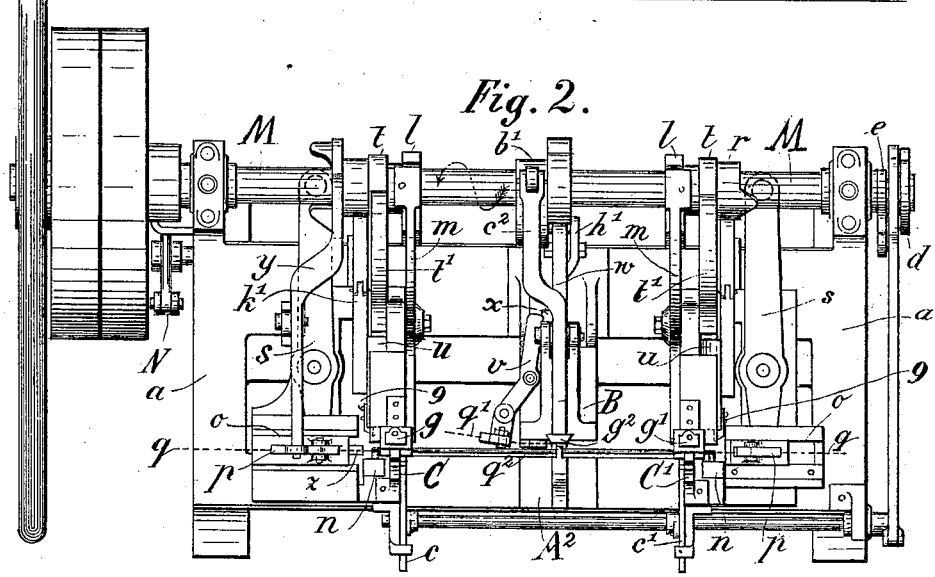
Figure 13:
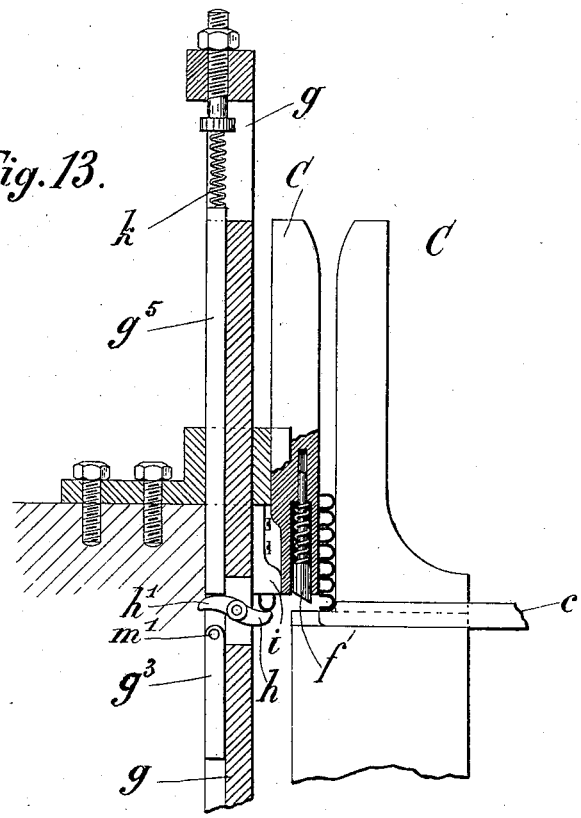
Figure 14:
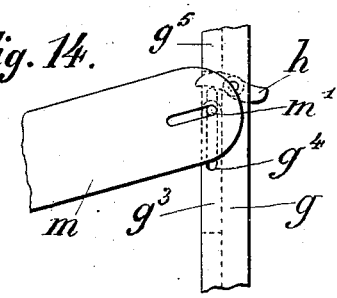
Figure 15:
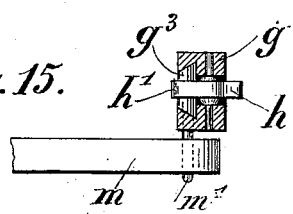

Figure 1 is a side elevation of a machine embodying my improvements. Fig. 2 is a plan of the same; Fig. 3, a section along line X X of Fig. 1; Fig. 4, a section along line Y Y of Fig. 1 looking in the direction of the arrow, and Fig. 5 a section along line Z Z of Fig. 1 looking in the direction of the arrow. Figs. 6 and 6ª represent, on a larger scale, the operating-tools or dies to which each end of the rib is subjected one after another, Fig. 6 being an elevation, and Fig. 6ª a plan, of the same. Figs. 7, 7ª, and 7ᵇ represent one of two horizontally-movable slides *u*, also shown in Fig. 2, provided with dies or operating-tools adapted to act in conjunction with the tools shown in Figs. 6 and 6ª, Fig. 7 being a side elevation of the said slide and Fig. 7ª a plan and Fig. 7ᵇ an end view of the same. Figs. 8 and 8ª represent, on a larger scale, the mechanism for forming the hinges in the middle of the ribs, Fig. 8 being a vertical section, and Fig. 8ª an end elevation, of the same. Figs. 9 and 9ª represent the same mechanism in a different stage of operation. Fig. 10 is a partial elevation corresponding to Fig. 5, on a larger scale, and showing one of the two upright feed-channels for the umbrella-ribs. Fig. 11 is a plan corresponding to Fig. 10. Fig. 12 is a side view, and Fig. 12ª a cross-section, of a finished umbrella-rib made by this machine. Fig. 13 shows one of the upright feed-channels and one of the vertically-movable slides, together with the device for gripping the ribs, partly in vertical section and partly in side view. Fig. 14 is a side view showing the connection between the said vertical slide and the lever for setting it in motion. Fig. 15 is a horizontal section of the said vertical slide with plan of the gripping device.

The machine is composed of three principal parts—viz., a pair of mechanisms A A', Figs. 1, 10, and 11, which serve to operate on the heads of the paragon ribs and are attached to the machine-bed *a* by means of cross-beams *b*, but so that they can be shifted according to the length of the ribs, and the intermediate mechanism A² and B, Figs. 1, 2, 8, and 9, serving to produce the hinges.

The automatic introduction of the U-shaped ribs into the machine with their openings placed upward is rendered possible by the peculiar feed motion of the same as they issue from the feed-regulator. I will therefore commence with describing the working of the feed-regulator.

After the ribs have been cut to the required length in a separate machine they are piled one upon the other with their wide sides in contact and introduced into the feed-regulators C C or feed-channels in such a manner that their open sides will be situated toward the left wall of the feed-channels, Fig. 10. The lowest rib rests at each end in a recess of the two transporting-levers *c c'*, which are made to fit the shape of such a rib and are set in motion at the proper time from the main shaft by means of an eccentric or cam *d*, Figs. 10 and 11, so as to push the rib into the machine, after which a second or return eccentric *e* places the levers again under the regulators for receiving a new rib. During the forward motion of the rib by means of the transporting-levers the said rib, which is supported at its base, will abut with its upper edge against the beveled extremities of two vertically-movable pins $f$, pressed downward by helical springs, said pins and springs being lodged in a recess of the nearest guide-piece C and the extremity of the pins projecting below the same into the path of the rib, which is therefore caused to turn from the lying into an upright position, so that it will be introduced into the machine proper with the open side directed upward, while the other ribs retain their horizontal position, and an interference between the ribs is thus avoided. At every revolution of the machine a rib is taken off the feed channels or regulators, while the others are retained partly by the back of the transporting-levers $c$, which have advanced, and partly by the said pin $f$, one for each lever $c$, which pins are pressed upward by the transporting-levers during the transport of the rib and subsequently depressed by the coiled spring acting on the same. The rib introduced into the machine proper, as described, arrives first in front of the slides $g$ $g'$, Figs. 1, 5, 10, and 13, lodged in the two working mechanisms A A', where it is pressed at each end against an abutment $i$, secured to the slide $g$ or $g'$ by a cam $h$, pivoted to the said slide and movable in a vertical slot of the same. This cam $h$ has a tailpiece $h'$, which is in contact with a sliding bar $g^5$, guided in the slide $g$ or $g'$, and adapted to transmit the pressure of an adjustable spring $k$. There is a cam $h$, sliding bar $g^5$, and spring $k$ for each of the two vertical slides $g$ and $g'$. The lever $m$, which is controlled by the cam $l$, acts on the slide $g$ through the intermediary of a vertical sliding bar $g^3$, guided in the slide, for which purpose a pin $m'$ is fixed in the said bar $g^3$ and passes through a vertical slot $g^4$ of the slide $g$ and also through a longitudinal slot of the lever $m$, as shown by Fig. 14. During the last part of a revolution of the cam $l$, Fig. 5, the lever $m$ ascends and causes the upper end of the sliding bar $g^3$ to press against the tailpiece $h'$, in consequence of which the front end of the cam $h$, which hitherto had held the paragon rib against the abutment $i$, descends and allows the rib to drop off. The upward motion of the sliding bar $g^3$ has also acted on the sliding bar $g^5$, so as to compress the spring $k$, which subsequently remains compressed until a fresh paragon rib has been inserted between the cam $h$ and the abutment $i$ and the lever $m$ has been caused to descend. The pressure of the spring $k$ clips the rib fast independently of the motion of the main shaft, while in the machines hitherto known the ribs are held fast by the toggle-lever pressure caused by the main shaft, which performs its function imperfectly, because the slightest irregularity in the working of the machine would reduce this pressure, and consequently release the paragon rib from its clip. The two vertical slides $g$ $g'$ are set in motion by the two revolving cams $l$ through the intermediary of the levers $m$ in four stages, Fig. 5, the rib clamped to the sides being consecutively guided onto the stationary dies 1 2 3 4, mounted on anvil-blocks $n$, (one at each end of the rib,) during a revolution of the cam in order to perform the operations necessary at the two ends of the rib, Fig. 6. When, for instance, the cams $l$ have brought the slides $g$ $g'$ and therefore the rib to the tool 1, the two wire slides $o$, movable parallel with the rib, Figs. 1, 2, and 3, fetch at the same time, by means of their tongs $p$, a thin stiffening-wire $q$, coming from a reel, (not shown,) and carry it along a short distance, about equal to the width of the die 1. The wire slides are set in motion by means of revolving cams $r$, mounted on the main shaft, and levers $s$, Fig. 2, and recede again after having introduced the wire into the ends of the paragon wire or rib. Subsequently the horizontally-movable slides $u$, Figs. 2, 3, and 7, which are held in the mechanisms A A' and carry the respective movable dies or matrices 5 6 7 8, as well as the cutting-off knife 9, are caused to advance against the ribs by means of the revolving cams $t$ and the levers $t'$, Fig. 3, and the thin wires introduced into the rib are cut off close to the rib, Figs. 2 and 7. While the wires are being cut off the movable die 5 exerts upon the rib situated in front of the stationary die or anvil such a pressure that the thin wire introduced into the end of the rib is held fast and flattened in the rib, whereby a certain stiffness is imparted to the head of the rib, Figs. 6 and 7. After the first flattening or crushing action on the die 1 the carriages $u$ recede again, and the slides $g$ $g'$, which are constantly clamping the ribs near the ends, carry it onto the stationary die or anvil 2, for which purpose the cam $l$ causes the lever $m$ to turn through an angle corresponding to the distance between the tools 1 and 2. Subsequently the slides $u$ make another forward motion and completely flatten the rib at the two ends—that is to say, the extremity $a^2$ is pressed flat in the mechanism A' and the extremity $a^3$ or shield in the mechanism A, Fig. 12. While the two working mechanisms A A' are acting upon the paragon rib in the manner described the third mechanism, which is situated between the same and provided with an anvil $A^2$, Fig. 4, performs the bending of the hinge serving to fasten the stretchers $a^4$ in Fig. 12 from a round wire and its insertion into the rib, which latter operation in consequence of the upward direction of the opening is again much easier than in the machines hitherto known. As mentioned above, the hinge-pin is made from a round wire $q'$, Figs. 1 and 2, which is wound off a reel (not shown in the drawings) by means of a lever $v$, Figs. 1, 2, and 4, provided with a pair of wire tongs and pivoted on the mechanism B, which lever is caused to turn on its fulcrum by the forward motion of the slide $w$, provided with a lug $x$, so as to draw from the reel a length of wire sufficient for the formation of the hinge. The wire $q'$ is now led through a wire-guide $q^2$, Figs. 1 and 2, formed on the working mechanism, and through the slot of the slide $g^2$ until it arrives underneath the paragon rib, as illustrated by Fig. 8. Simultaneously with this introduction of the wire the wire-carriage $o$ in the working mechanism A makes again a forward motion after the tongs have been set out of action by a disengaging-lever $y$, Figs. 1 and 2, acting with a roller upon the tail of the tongs, and pushes a spherically-concave projection against the extremity of the rib projecting from the die 2 by means of a steel tool $z$, Fig. 2, fixed to the carriage, while both matrices or dies are still under pressure. In this manner the so-called "ball" of the paragon rib is formed, ($a^5$ in Fig. 12.) Subsequently the rib is transported onto the rounding-tool 3 by the motion of the slides $g$ $g'$, which tool exists only in the working mechanism A', and the head of the rib is consequently rounded off by the half-round die 7 of the carriage $u$, which had previously moved back at a right angle to the rib and now again moved forward. This rounding is dispensed with in the working mechanism A. At the same time the slide $g^2$, forming part of the middle mechanism, is caused to descend by the corresponding cam $b'$ and lever $c^2$, but without immediately acting on the wire, because the slide $g^2$ has a slot, which enables it to slide downward along the same until the die $d'$, fixed to the slide, has arrived in close proximity to the hinge-wire $q'$ to be cut off and the paragon rib has passed from the position of Fig. 8 to the position of Fig. 9, where it faces the edge of the slanting shoulder $w'$ of the slide $w$, the slide $w$ having at the same time commenced its forward motion. When the tongue $e'$, attached to the slide $w$, has arrived underneath the wire $q'$, the push-bar $f'$, having in front a cutting edge or knife, is thrust forward by a sliding block $h'$, Figs. 2, 8, and 9, and cuts off the piece of hinge-wire. The latter now drops by its own weight until it reaches the tongue $e'$ and is now held fast, because in the meanwhile the slide $w$ has advanced and the slide $g^2$ has descended, together with the die $d'$, which presses upon the wire from the top and bends it into the shape of a hinge-piece, the tongue $e'$, which is rounded at the top, serving as a bending-anvil. The two ends of the bent hinge-wire, which now has the shape of a horseshoe, descend into the groove of the paragon rib and abut against the bottom of the said groove, where they are bent outward, as shown in Figs. 9$^a$ and 12. Subsequently the slide $w$ advances again a short distance corresponding to a projection of the cam $b'$ and presses the paragon rib between the projecting face of the anvil $A^2$ and the slanting edge or shoulder $w'$, situated underneath the tongue $e'$, in order to secure the hinge-piece to the rib. After the pressure of the push-bar $f'$ upon the knife-edge has ceased it is withdrawn into its starting position by a coiled spring $f^2$. As the slide $w$ and the slide $g^2$ have now likewise resumed their former position, the paragon rib to be operated upon arrives at the fourth and last stage of the working process in order to be placed by the slides $g$ $g'$ upon the die 4 and be perforated by the perforating-carriages $k'$, held separately in the two stamping-slides $u$, Fig. 7, the needle 8 being caused to act on the flattened ends of the rib, Figs. 6, 7, and 12. The perforating-slides $k'$ are guided independently of the slides $u$ and are thrust forward by separate projections of the cam. To facilitate the removal of the perforating-slide or of the needle, it has a hinge-joint, (shown in Fig. 2,) by means of which it can be disengaged from the cam and taken out of the carriage $u$ sidewise. As the perforating-needles break easily and must therefore be frequently renewed, this feature constitutes an important advantage in comparison with the machines hitherto known, in which the entire carriage must be taken out of the working mechanism when a needle breaks. The perforation of the paragon rib is the last operation in the manufacture of such ribs for umbrella-frames. Consequently after all the tools have returned to their starting position and the lateral pressure on the rib has ceased by the return motion of the slides $g$ $g'$ the rib drops out of the machine through a suitable opening.

The whole of the eccentrics or cams are set in motion from a common driving-shaft M, driven by a belt.

An ordinary disengaging-gear N, with pedal motion, is provided for suddenly stopping the machine when required, as indicated on Sheet 1, Fig. 1.

What I claim is—

1. A machine for the manufacture of paragon ribs, comprising in its construction a pair of upright guides adapted to hold a stack of horizontal pieces of channel-wire placed one upon the other, a pair of vertically-movable slides provided with clamping devices adapted to receive and hold a horizontal paragon rib with its groove turned upward, mechanism for transporting the lowest rib of the stack toward the said slides and to deliver it with the groove turned upward, two pairs of tool-carriers armed with tools adapted to operate simultaneously on the two ends of the rib from opposite sides, each carrier having a series of tools placed one above the other, and the tools of the same pair being adapted to operate in conjunction upon opposite sides of the rib, a driving-shaft and mechanism for transmitting motion from the driving-shaft to the slides, substantially as described.

2. A machine for the manufacture of paragon ribs, comprising in its construction a pair of upright guides adapted to hold a stack of horizontal pieces of channel-wire placed one upon the other, a pair of vertically-movable slides provided with clamping devices adapted to receive and hold a horizontal paragon rib with its groove turned upward, mechanism for transporting the lowest rib of the stack toward the said slides and to deliver it with the groove turned upward, two pairs of tool-carriers armed with tools adapted to operate simultaneously on the two ends of the rib from opposite sides, each carrier having a series of tools placed one above the other, and the tools of the same pair being adapted to operate in conjunction upon opposite sides of the rib, a pair of slides adapted to move longitudinally toward the ends of the rib and carrying tools for shaping the ends of the rib by longitudinal pressure, a driving-shaft and mechanism for transmitting motion from the driving-shaft to the slides, substantially as described.

3. A machine for the manufacture of paragon ribs, comprising in its construction a pair of vertically-movable slides adapted to hold a rib placed horizontal with its groove at the top, mechanism for feeding a thin hinge-wire in a line parallel to the rib and above the same, a slide movable horizontally at right angles to the rib and to support the same, and having an upward projection adapted to press against the side of the rib, an anvil-block serving as an abutment for the opposite side of the rib while the said slide presses against the rib and also as a guide for the slide, a knife adapted to move horizontally at right angles to the hinge-wire, and to cut off the same, a vertically-movable slide adapted to move across the middle of the rib, and carrying a bending-die adapted to descend upon the cut-off piece of hinge-wire and to bend the same so that its extremities enter the groove of the rib and are bent outward by their pressure against the bottom of the groove, a driving-shaft and mechanism for transmitting motion from the driving-shaft to the various hinge-forming mechanisms, substantially as described.

4. In machinery for the manufacture of paragon ribs, the construction of vertical guides C, with horizontally-movable slides $c$, vertically-movable pins $f$ and helical springs adapted to press the said pins downward, and a pair of vertical slides $g$, $g'$ provided with a spring clamping device adapted to hold a paragon rib horizontally with the groove at the top, the whole being constructed and adapted to operate substantially as described.

5. In machinery for the manufacture of paragon ribs, the combination of a vertically-movable device for holding a grooved wire horizontally, with a stationary tool-holder $n$ carrying stationary operating-tools 1, 2, 3, 4, a movable tool-holder $u$ carrying operating-tools 5, 6, 7, 8, 9, and adapted to move horizontally toward the said stationary tools, a horizontally-movable slide $o$ provided with a gripping device adapted to grip a thin wire $q$ and to introduce it longitudinally into the grooved-wire mechanism for intermittently raising and lowering the said device for holding the grooved wire, mechanism for imparting a to-and-fro motion to the slide $o$ and for operating the gripping device, and mechanism for imparting a to-and-fro motion to the tool-holder $u$, substantially as described.

6. In machinery for the manufacture of paragon ribs, the combination of a vertically-movable device for holding a grooved wire horizontally with the groove turned upward, with a slide $w$ carrying a tongue $e'$ and adapted to move at right angles across the said grooved wire, an anvil-block $A^2$ facing the slide $w$, a device for feeding a round hinge-wire $q'$ in a line parallel to the grooved wire, a knife $f'$ adapted to cut off the hinge-wire, a slotted slide $g^2$ movable vertically and carrying a bending-die $d'$ adapted to descend upon the cut-off piece of hinge-wire, to bend the same over the tongue $e'$ and force the wire ends into the groove of the paragon wire, substantially as described.

7. In machinery for the manufacture of paragon ribs, the combination of a tool-slide $u$ adapted to move at right angles to the paragon rib, with a driving-shaft M placed parallel to the paragon rib, mechanism for operating the tool-slide from the driving-shaft, and a perforating-slide $k'$ composed of two parts connected by a hinge-joint and adapted to move independently of the slide $u$, the front part of the slide $k'$ being guided in the tool-slide so as to move parallel with the same, while the rear part rests with its rear end on a cam of the driving-shaft and is adapted to transmit motion from the latter to the front part, substantially as described and for the purpose specified.

In testimony whereof I have signed this specification in the presence of two subscribing witnesses.

GUSTAV WILMS.

Witnesses:
WILLIAM H. MADDEN,
W. WILEY.